United States Patent
Manning et al.

(10) Patent No.: US 6,519,266 B1
(45) Date of Patent: Feb. 11, 2003

(54) LAYERING OF WIRELESS PACKET DATA SERVICE

(75) Inventors: Serge Manning, Plano, TX (US); Alberto Gutierrez, Plano, TX (US); Ibrahim Ghaleb, Alexandria (EG)

(73) Assignee: Nortel Networks Limited, St. Laurent, CA (US)

( * ) Notice: Subject to any disclaimer, the term of this patent is extended or adjusted under 35 U.S.C. 154(b) by 0 days.

(21) Appl. No.: 09/218,964

(22) Filed: Dec. 22, 1998

Related U.S. Application Data

(60) Provisional application No. 60/070,407, filed on Jan. 5, 1998.

(51) Int. Cl.$^7$ .................................................. H04J 13/00
(52) U.S. Cl. ..................... 370/469; 370/335; 370/479; 370/328
(58) Field of Search ................................. 370/335, 342, 370/437, 441, 469, 479, 328, 338

(56) References Cited

U.S. PATENT DOCUMENTS 6,137,802 A * 10/2000 Jones et al. ................. 370/401
6,272,121 B1 * 8/2001 Smith et al. ................. 370/342
6,363,058 B1 * 3/2002 Roobol et al. ............... 370/310
2001/0036831 A1 * 11/2001 Rezaiifar et al. ............ 455/455

OTHER PUBLICATIONS

Knisely, D. N., "Proposal for IS–95 3G MAC Layer High Level Structure and Terminology," Lucent Technologies, Naperville, IL, Dec. 11, 1997, pp. 1–12.

Ravi, Shobha, "MAC Service Model–Packet Data Version 2.0—Dec. 8, 1997", MAC Adhoc Group, Phoenix, Copyright 1997, pp. 1–18.

* cited by examiner

Primary Examiner—Steven Nguyen
Assistant Examiner—Duc Duong
(74) Attorney, Agent, or Firm—Haynes and Boone, LLP

(57) ABSTRACT

A communications system and method that separates operational aspects of a packet data service to be provided on a wireless network into separate, independent state diagrams. The method first decomposes the communication service into several different service layers. The method then defines a dynamic behavior of the service layers and an interaction therebetween. Once the behavior and interaction between the layers is defined, the method creates a control element with which to coordinate the service layers.

16 Claims, 4 Drawing Sheets

LAYERING OF WIRELESS PACKET DATA SERVICE

CROSS REFERENCE

This application claims the benefit of Provisional Application Serial No. 60/070,407 filed Jan. 5, 1998.

TECHNICAL FIELD

This invention relates generally to management techniques for a wireless communications network and, more particularly, to a system and method for layering a packet data service in the wireless communications network.

BACKGROUND OF THE INVENTION

There are many types of calls that are being performed in various telecommunications networks. The public switched telephone network ("PSTN") handles voice calls between two voice terminals and has been adapted to handle data calls between two data terminals through use of modems and the like. Likewise, many data networks, such as the internet, handle data and voice calls between two terminals.

Wireless networks are also commonplace, and can connect to the PSTN through one or more mobile switches. Furthermore, the wireless networks can be connected to a data network through interface systems such as one using data interworking function technology. In this way, a mobile terminal operating in a wireless network can connect to a remote terminal through the wireless network and further through the PSTN or the data network.

For example, in FIG. 1, the reference numeral 10 designates a wireless telecommunications system 10. In the present example, the network 10 is a cellular network or a personal communication service network that utilizes code division multiple access ("CDMA") technology. The CDMA network 10 includes several components, including a mobile switching center ("MSC") 12, a base station controller ("BSC") 14, a home location register ("HLR") 16, and an interworking function system ("IWF") 18. It is understood that the components described in FIG. 1 are merely exemplary, using terms that are well known in the telecommunications industry to represent only one type of component.

The components of the CDMA network 10 are connected in various methods, such as signaling system 7 ("SS7"), Ethernet, and so forth. To accommodate the various methods, the interconnections are illustrated in a functional sense. Therefore, it is understood that the descriptions of the components and interconnections therebetween are meant for exemplary purposes.

A first data device 20 is connected through a wireless link 30 to the CDMA network 10 using an IS-99 wireless communications device (not shown). IS-99 is a CDMA Circuit Switched Data Specification that defines how a CDMA mobile terminal establishes a circuit call through a modem pool of the IWF 18. Other wireless communication devices can provide similar functionality, such as an IS-707 device. A second data device 24 is connected to a data network 26. For the sake of further example, the first data device 20 is a laptop computer, the second data device 24 is a desktop computer, and the data network 26 is a packet data network ("PDN").

The HLR 16 provides a database for storing customer profile information such as features, dialing capabilities, and a home serving area identification. In the present example, the home serving area identifies the MSC 12 in which the first data device 20 is located. One example of an MSC is a DMS-MTX MSC manufactured by Northern Telecom Ltd. of Montreal, Canada. The operation of the HLR 16 and the MSC 12, along with other switching centers and databases not shown, is well known and understood in the art.

The IWF 18 provides several functions. For one, it establishes control signal communications with the laptop 20 using a predetermined protocol stack. The protocol stack is commonly used to support various communications in the wireless network 10. The IWF 18 also supports a data connection to the remote data terminal 24. The data connection can either be through the PSTN or through the PDN 26.

The IWF 18 is able to establish a data path to the PDN 26 using a CDMA fast connect, or hybrid data call, connection. The IS-99 wireless terminal 22 of the first data device 20 connects with the BSC 14 through a wireless link 30. The BSC 14 has a link 32 (either wireless or physical) to the MSC 12. The MSC 12 then establishes a data path (e.g. using a data bus) and a signaling path (e.g., using Ethernet), collectively designated with a bus 34, to the IWF 18. The IWF terminates the signaling path with an IS-99 device and routes the data to the data network 26.

The IWF 18 is also able to establish a data path to the PSTN using a CDMA circuit switched connection. With a circuit switched data path, the IWF 18 terminates the signaling path with an IS-99 device and routes the data to an internal modem pool (not shown). The data from the modem pool is then sent back to the MSC 12 on a bus 36 and from there to the PSTN through a trunk 38. Once connected to the PSTN, several different gateways are available to the PDN 26, such as through an internet service provider (also not shown).

CDMA technology, such as is used in the wireless network 10 of FIG. 1, is a continually evolving technology. In 2nd generation CDMA systems, when the data device 20 sends data over the CDMA network 10, the device repeatedly performed the steps of: making a call, sending data, and hanging up. This inefficient use of system resources by making multiple calls is being addressed by a 3rd generation CDMA technology.

Standards for 3rd generation CDMA systems are currently being designed to include a medium access control ("MAC") layer for handling layer specific functions. The proposed MAC layer controls access to the physical channels in the CDMA network 10 on which the data device 20 may arrange packets of data.

The MAC layer proposed for 3rd generation systems gets the data device 20 on and off a path or channel without making multiple calls. Instead of using "slots," such as in time division multiple access networks, CDMA technology provides software-based logical channels through which data is sent. These logical channels, each of which may provide a different data service, can simultaneously exist on the same physical channel. The proposed MAC layer also serves to coordinate these different services.

A particular logical channel has transmission and reception characteristics and is restricted to carrying a certain set of information. During system operation, information on a logical channel is carried on a real physical channel, which is a radio channel employing CDMA technology. In this way, a logical channel is said to be mapped to a physical channel.

Logical channels are divided in two broad classes: common and dedicated. Common logical channels are mapped to common physical channels while dedicated logical channels are mapped to dedicated physical channels. A common physical channel is a CDMA based radio channel that may be shared between one base station and a plurality of mobile stations. A dedicated physical channel is a CDMA based radio channel that is assigned by a base station (for a period of time) to exchange information between exactly one base station and exactly one mobile station.

Referring to FIG. 2, the MAC layer proposed for 3rd generation systems attempts to get the data device 20 on and off a path or channel without making multiple calls. The proposed MAC layer operates according to a packet data service state diagram 100. Each state of the state diagram 100 depicts different stages of packet data service and is associated with conditions of the network 10. These conditions include permitted actions and the availability of specific logical channels.

The state diagram 100 for the proposed MAC layer is an enhancement of the 2nd generation packet data service (as described in IS-707) and includes a packet null state 102, an initialization state 104, a reconnect state 106, an active state 108, a control hold state 110, a suspended state 112, and a dormant state 114.

The packet null state 102 is the initial state and corresponds to the absence of packet data service. In the packet null state 102, no dedicated FL (Forward Link, from base station to mobile) or RL (Reverse Link, from mobile to base station) channels are allocated and no packet data service is active. However, the common physical channels packet access channel (PACH) and packet paging channel (PPCH) are both available.

The initialization state 104 corresponds to all the initialization steps of the packet data service including: service option negotiation and connection, traffic channel allocation and initialization, radio link protocol (RLP) initialization, and finally a point to point protocol (PPP) initialization. As in the packet null state 102, only the PACH and PPCH channels are available.

The reconnect state 106 corresponds to the re-establishment of data communications during an established packet data session. The data device 20 (FIG. 1) reaches this state when it is going from a dormant state to an active state. The reconnect state 106 corresponds to all activity necessary to re-establish the data communications channel including: service option negotiation and connection, traffic channel allocation and initialization, and RLP initialization. PPP has already been established and does not require initialization. As in the previous state, only the PACH and PPCH channels are available.

The active state 108 is the most highly connected state with both dedicated FL and RL channels established. In this state, the logical dedicated MAC control channel (DMCH), dedicated signaling control channels (DSCH), and dedicated traffic channels (DTCH) are established. The packet data service 100 stays in this state for the duration of user data transmission and reception.

The control hold state 110 is entered when user data has not been exchanged for a predetermined period of time. Although the logical DTCH channel is dropped, the logical DMCH and DSCH channels are still available. This maintains a dedicated channel between the BSC 14 and data device 20 that allows control information to be exchanged quickly. If user data is to be exchanged, execution returns to the active state 108.

If the packet data service spends a predetermined period of time in the control hold state and still no user data is exchanged, execution proceeds to the suspended state 112. Continuous communication between the BSC 14 and data device 20 cease since all dedicated channels are dropped. Only the common channels PACH and PPCH are present. Although this frees up system capacity, some system resources, such as the service option and RLP, are still logically maintained. The suspended state 112 allows a quicker return to the active state 108 than from the dormant state 114.

After a relatively long period of time with no user data exchange, the packet data service enters the dormant state 114. Similar to the suspended state 112, there are no dedicated channels available. Only the common channels PACH and PPCH are present. In addition, the service option is not connected, and RLP is lost. However, PPP is retained and the packet data session is still logically connected. This allows the return to the active state 108 if the exchange of user data is desired.

In general, the proposed MAC layer 100 begins at the packet null state 102 and execution proceeds to the initialization state 104 upon receipt of a packet service request from the data device 20. Once initialized, a "service option" is connected and execution proceeds to the control hold state 110. The service option remains connected when in states 108, 110 and 112, and is not connected in the remaining states. Transitions from one state to another occur for many reasons, such as responses to user actions, system events, or the flow of user data.

A problem with the proposed MAC layer 100 is that it is a monolithic packet data model that captures every operational aspect of the packet data service in one application. As a result, the proposed MAC layer 100 is very difficult to modify or add features without impacting the entire model. In addition, certain functionality performed by the MAC layer 100 is redundant with functionality performed by other layers in the CDMA network 10.

SUMMARY OF THE INVENTION

The present invention, accordingly, provides a communications system and method that separates operational aspects of a service to be provided on a network into separate, independent state diagrams. To this end, one embodiment provides a method of layering a communication service in a communications network by decomposing the communication service into several different service layers. The method then defines a dynamic behavior of the service layers and an interaction therebetween. Once the behavior and interaction between the layers is defined, the method creates a control element with which to coordinate the service layers.

In one embodiment, the communication service is a packet data service, such as would be used in a CDMA wireless network. The packet data service may work independently of a voice service in the communications network.

Another embodiment provides a method for facilitating a packet data service in a communications network, such as a CDMA wireless network. A first layer is provided for monitoring and controlling the use of logical channels on a physical layer in the CDMA wireless network. A second layer is provided for performing point-to-point protocol (PPP) functions and a third layer is provided between the first and second layers for receiving and coordinating data transfers therebetween. In one embodiment, each of the layers is controlled by its own, independent state machine.

In another embodiment of the above described method, the CDMA wireless network includes a medium access control (MAC) layer that is dependent on the physical layer. This physical layer dependent MAC layer dynamically maps the logical channels to a set of physical channels on the physical layer.

In yet another embodiment of the above-described method, a fourth layer is provided for managing call processing messages and functions in the CDMA network, the fourth layer being controlled by a fourth state machine. The fourth layer may also support radio protocol functions.

Another embodiment provides a method for facilitating a packet data service and a voice service in a CDMA communications network. The method provides a first MAC layer for monitoring and controlling the use of logical channels used by the packet data service, a second MAC layer for monitoring and controlling the use of logical channels used by the voice service, and a third MAC layer for mapping logical channels to physical channels on the physical layer. In some embodiments, there may also be a fourth MAC layer for monitoring and controlling the use of logical channels used by a different data service, such as circuit data.

The method also provides a first set of upper-level layers for performing PPP functions and call control functions for the packet data service and a second set of upper-level layers for performing PPP functions and call control functions for the voice service. The first and second sets of upper-level layers interact with the first and second MAC layers, respectively. Also, the first and second MAC layers and the first and second sets of upper-level layers all operate independently from each other. As a result, multimedia service is coordinated among different, physical layer independent MAC layers and a common, physical layer dependent MAC layer.

DESCRIPTION OF A PREFERRED EMBODIMENT

As discussed above, FIG. 1 is an illustration of a conventional CDMA wireless network 10 connected to a data network 26 and the public switched telephone network. However, the operation of the CDMA network 10 of FIG. 1 will benefit from the present invention described below.

Figure 1:
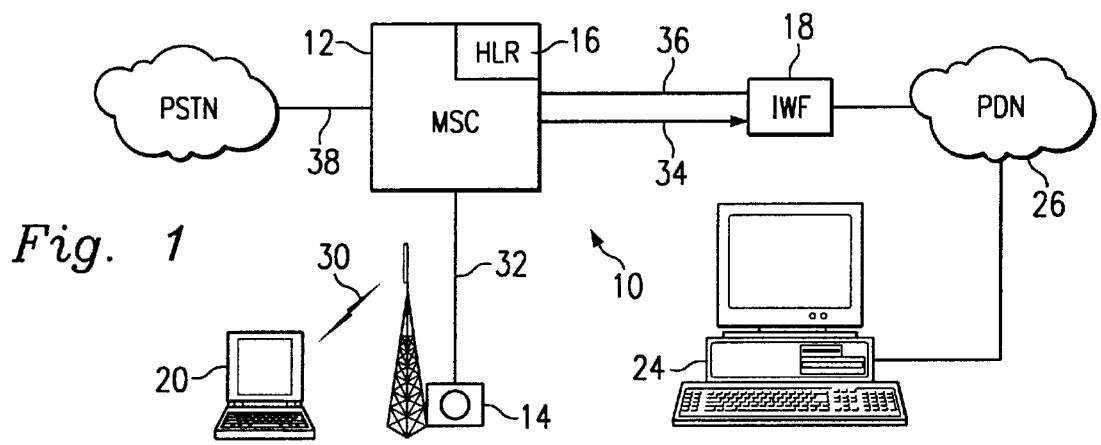
FIG. 1 is a functional block diagram of a CDMA wireless network connected to a data network and the public switched telephone network.
Figure 2:
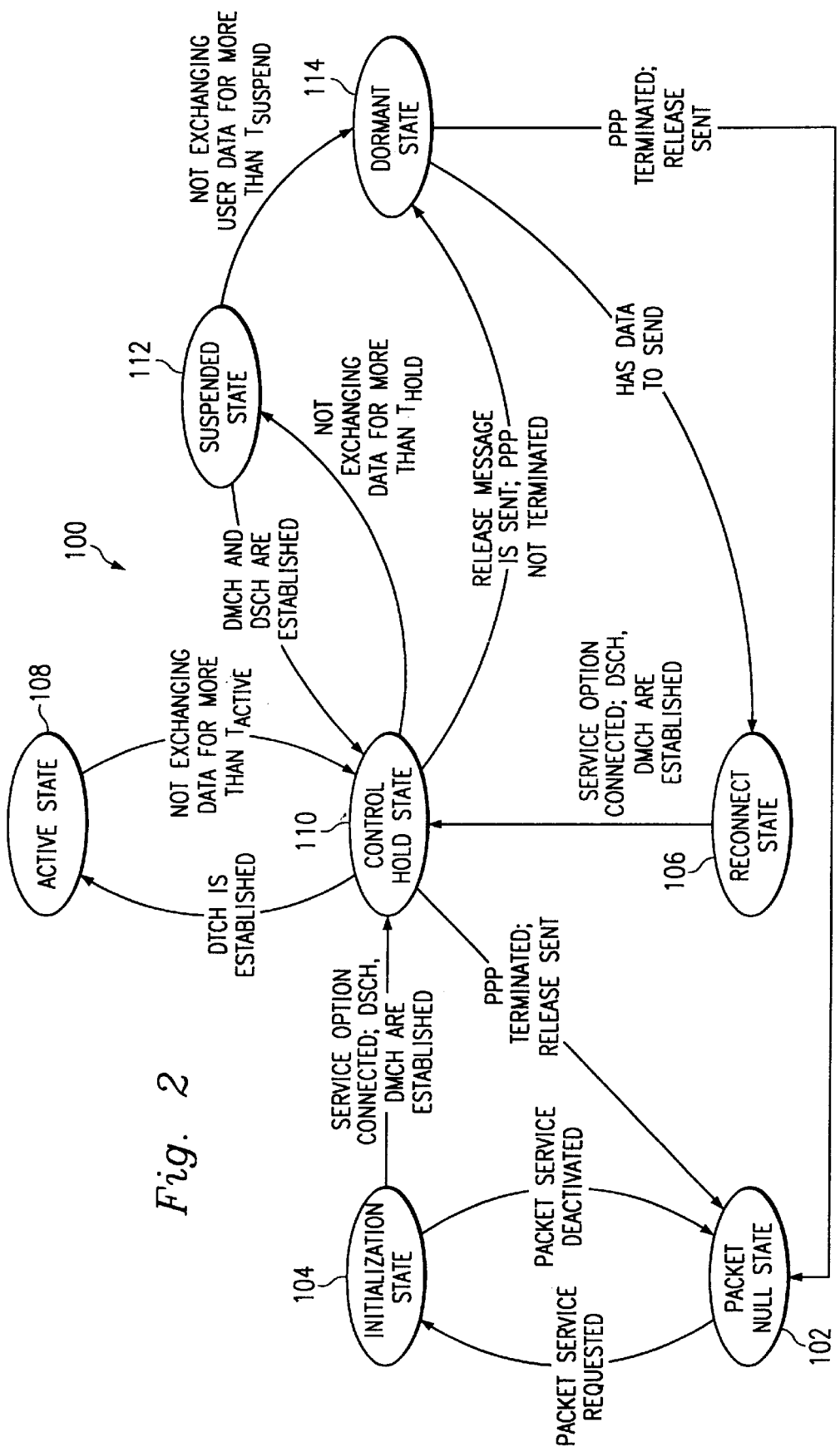
FIG. 2 is a state diagram of a prior art packet data service for controlling the operation of the CDMA network of FIG. 1.

One embodiment of the present invention provides a decomposition of conventional packet data service models (such as is described with respect to FIG. 2) into a number of cooperating service layers for use in the CDMA network 10 of FIG. 1. Furthermore, the present embodiment provides state machine definitions for each of those layers. Although the present embodiment describes an improved MAC layer, the MAC layer of this embodiment is different from the conventional MAC layer proposed for 3rd generation CDMA (described above with reference to FIG. 2).

The packet data service of the present embodiment is achieved by aggregating the services of all layers, hence the layers are dynamic. Layering is a technique to write complex software by defining rules for a specific layer at a time. Software written for a specific layer, and conforming to the rules of that layer, is compatible with layers above and below it.

Figure 3:
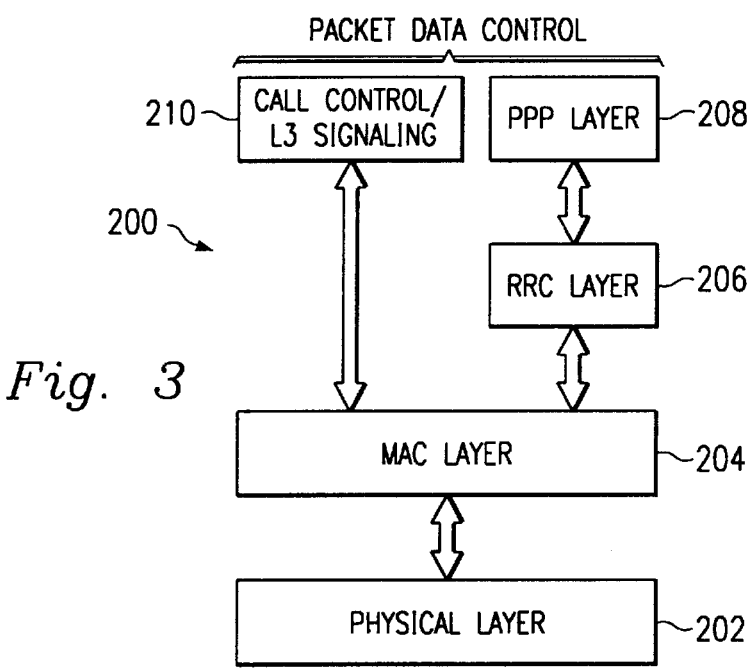
FIG. 3 is a layer diagram of a packet data control function for controlling the operation of the CDMA network of FIG. 1 according to features of the present invention.

Referring to FIG. 3, a packet data control function 200 provides a centralized application that services a plurality of layers including a physical layer 202, a MAC layer 204, an RRC layer 206, a PPP layer 208, and a call control/L3 signaling layer 210.

The physical layer 202 includes all electrical and mechanical aspects relating to the connection of the data device 20 to the MSC 12 (FIG. 1). The physical layer 202 is considered the lowest layer and deals with issues such as coding, spreading, and radio frequency modulation. The present embodiment has some layers that are independent of the physical layer while other layers that are dependent.

The MAC layer 204 grants access to local channels and includes both physical layer independent (PLI) and physical layer dependent (PLD) components. For the sake of clarity, only the PLI components will be discussed with reference to MAC layer 204. The PLD components will be discussed separately, with reference to FIG. 8, below.

The MAC layer 204 generates requests with respect to data flow (such as burst requests). The MAC layer 204 is considered the second lowest layer and is otherwise unaware of the specifics of the higher layers. The MAC layer 204 can support multiple services such as voice, video, and e-mail, each capable of having a state machine running at the same time. The MAC layer 204 is discussed in greater detail with respect to FIG. 4, below.

The RRC layer 206 performs radio link protocol (RLP IS-707, or simply RLP) and radio burst protocol (RBP) functions. The RRC layer 206 is an intermediate layer between the MAC layer 204 and the upper layers 208, 210. For example, the RRC layer 206 can receive and coordinate short data bursts from the PPP layer 208 to the MAC layer 204. The RRC layer 206 is discussed in greater detail with respect to FIG. 5, below.

The PPP layer 208 is an upper layer that is a conventional protocol in many data communications systems for performing standard PPP functions. The PPP functions are described in PPP RFC 1661, which is a standard published by the Internet Engineering Task Force (IETF). When the PPP layer is active, packet data service is active. The PPP layer 208 is discussed in greater detail with respect to FIG. 6, below.

The call control/L3 signaling layer 210 is an upper layer that manages call processing messages and functions. The call control/L3 signaling layer 210 controls the overall call state, e.g., whether or not the data device 20 (FIG. 1) is in a call. This includes many functions, such as call origination and termination messages between the first data device 20 and the BSC 14. The functionality of the call control/L3 signaling layer 210 is dictated by the IS-95 standard, and will not be altered, in any way, by the present invention. Therefore the call control/L3 signaling layer 210 is presently shown merely for the sake of completeness, it being understood that CDMA call control is well known in the art.

Each of the layers is independent and has a state machine that guides its operation. The packet data control function 200 triggers the different layers to start different state machines.

The packet data control function 200 is created by "decomposing" the packet data service model (FIG. 2, prior art) into the above-described layers. All service layers are coordinated by the packet data control function 200 so that its primary responsibility is to setup and bring down each instance of the packet data service. During each instance of the packet data service, the above-described layers operate independently of each other, except for service points defined between them.

The Mac Layer 204

Figure 4:
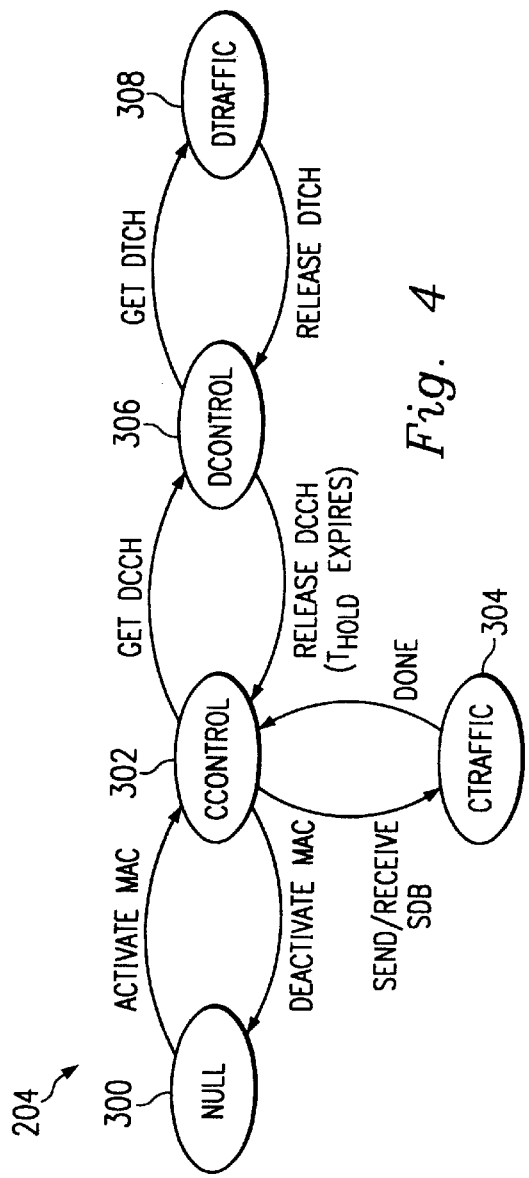
FIG. 4 is a state diagram of a MAC layer for controlling the operation of the CDMA network of FIG. 1 according to the packet data control function of FIG. 3.

Referring to FIG. 4, the MAC layer 204 includes a null state 300, a Ccontrol state 302, a Ctraffic state 304, a Dcontrol state 306, and a Dtraffic state 308. The null state 300 represents an inactive state for the MAC layer 204. In the Ccontrol state 302, common control channels are provided and monitored. Common control channels are channels that are shared among many users or are shared among many services (if multiple services are active). Dedicated channels, which are those channels (traffic channels or control channels) that are reserved for a single user and are dedicated to a single service, are not provided in the Ccontrol state 302.

In the Ctraffic state 304, user data is sent and/or received over the common traffic channels. There are no dedicated traffic channels (DTCH). In the Dcontrol state 306, there are dedicated control channels being used. These dedicated control channels include the dedicated signaling (L3) channel (DSCH) and the dedicated MAC channel (DMCH). There are no dedicated traffic channels. In the Dtraffic state 308, both dedicated control channels and dedicated traffic channels are being used.

The MAC layer 204 begins operation from the null state 300. When the MAC layer 204 is activated, execution advances to the Ccontrol state 302. If the MAC layer 204 is deactivated, execution returns to the null state 300. Execution can proceed from the Ccontrol state 302 to the Ctraffic state 304 whenever a short data burst (or SDB, see FIG. 5) is sent or received. The Ctraffic state 304 returns to the Ccontrol state when it has finished sending or receiving the SDB.

Execution can also proceed from the Ccontrol state 302 to the Dcontrol state 306 when the service is assigned a Dedicated Control Channel (DCCH) request. The Dcontrol state 306 returns to the Ccontrol state 302 after a time period $T_{hold}$ has expired. When the Dcontrol state 306 returns to the Ccontrol state 302, it releases the DCCH.

If the service is assigned a DTCH channel is received while in the Dcontrol state 306, execution proceeds to the Dtraffic state 308. The Dtraffic state 308 returns to the Dcontrol state 306 after the DTCH has been released.

Therefore, the MAC layer 204 is independent of the physical layer 202 and is used to monitor and control the use of logical channels, including both traffic and control channels.

The RRC Layer 206

Figure 5:
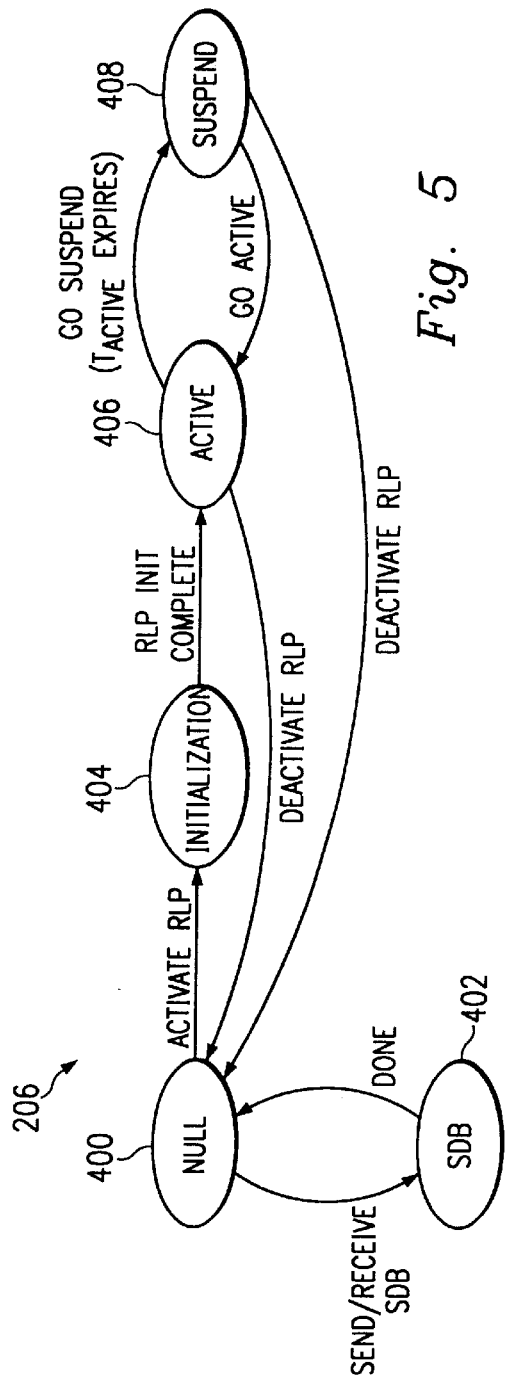
FIG. 5 is a state diagram of an RRC layer for controlling the operation of the CDMA network of FIG. 1 according to the packet data control function of FIG. 3.

Referring to FIG. 5, the RRC layer 206 includes a null state 400, a short data burst ("SDB") state 402, an initialization state 404, an active state 406, and a suspend state 408. The null state 400 represents an inactive state for the RRC layer 206. In the SDB state 402, RBP is currently being used to send or receive a short data burst.

The initialization state 404 is for when RLP is initializing and no user data can be sent. In the active state 406, RLP is established and ready to send or receive user data. In the suspend state 408, RLP is established but in a suspended mode of operation. All state information has been retained, but RLP needs to become active again to resume sending or receiving user data.

The RRC layer 206 begins operation from the null state 400. From the null state 400, execution can proceed directly to the SDB state 402 to send or receive a short data burst. When RLP is activated, execution advances to the initialization state 404. Once initialization is complete, execution proceeds to the active state 406. If RLP is deactivated, execution returns to the null state 400. Execution can proceed from the active state 406 to the suspend state 408 after a time period $T_{active}$ has expired with no user data being sent or received.

Therefore, the RRC layer 206 is an intermediate layer with an individual state diagram for coordinating the use of two different radio protocols (RLP and RBP). When in the active state 406 or the SDB state 402, the RRC layer 206 can also receive and coordinate data transfers between the upper layers and the MAC layer 204.

The PPP Layer 208

Figure 6:
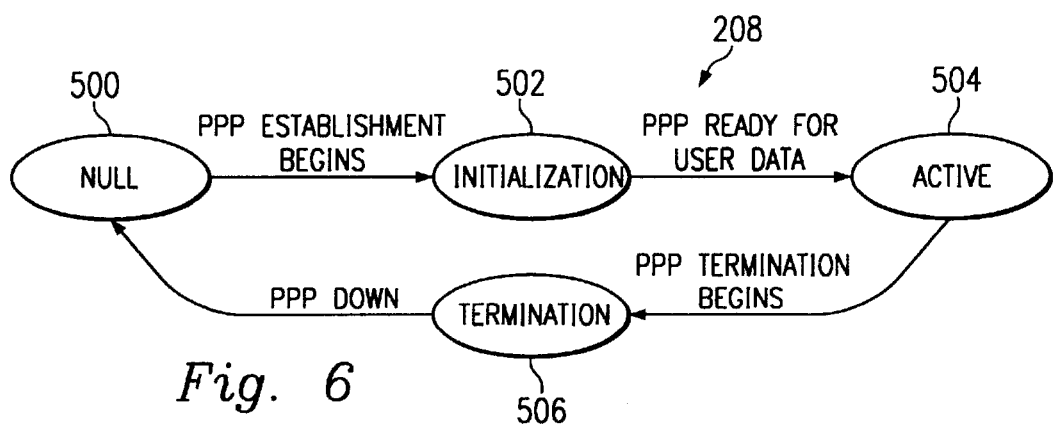
FIG. 6 is a state diagram of a PPP layer for controlling the operation of the CDMA network of FIG. 1 according to the packet data control function of FIG. 3.

Referring to FIG. 6, the PPP layer 208 includes a null state 500, an initialization state 502, an active state 504, and a termination state 506. The null state 500 represents an inactive state where no point-to-point protocol (PPP) has been established.

The initialization state 502 is for when PPP is initializing, such as for setting up the link 30 (FIG. 1). All PPP phases are initialized, including a link establishment phase, a network layer protocol configuration phase, and/or an authentication phase. No user data can be exchanged in the initialization state 502. In the active state 504, the links and protocol are established and PPP is ready to exchange user data. In the termination state 506, the link is terminated.

The PPP layer 208 begins operation from the null state 500. When PPP establishment begins, execution advances to the initialization state 502. Once initialization is complete, execution proceeds to the active state 504. When PPP establishment ends, execution returns to the null state 500.

Therefore, the PPP layer 208 is an upper layer with an individual state diagram for performing standard PPP functions. When the PPP layer is in the active state 504, packet data service is active.

The Packet Data Control Function 200

Figure 7:
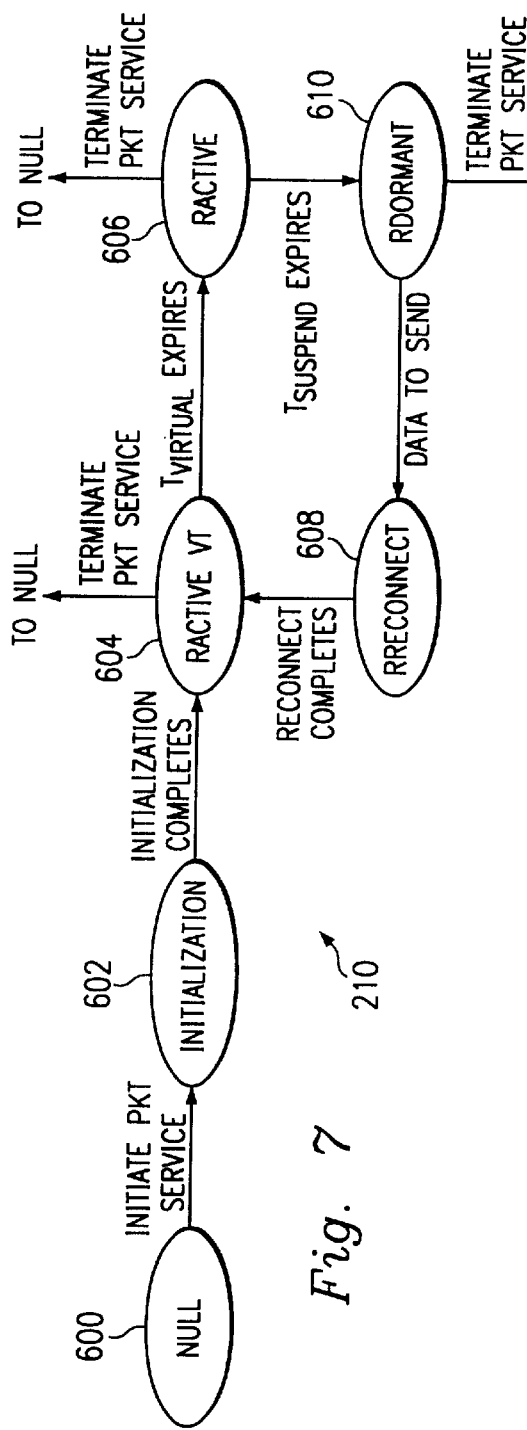
FIG. 7 is a state diagram of a Call Control layer for controlling the operation of the CDMA network of FIG. 1 according to the packet data control function of FIG. 3.

Referring to FIG. 7, the packet data control function 200 includes a null state 600, an initialization state 602, an RactiveVT state 604, an Ractive state 606, an Rreconnect state 608 and an Rdormant state 610. The null state 600 represents an inactive state for the packet data control function 200.

The initialization state 604 is for when packet data service is initializing. This includes service option establishment, dedicated traffic channel initialization, power control setup, RLP initialization, PPP link establishment, and internet protocol (IP) address assignment. In the RactiveVT state 604 and the Ractive state 606, packet data service is active and PPP is connected. Also, the RRC layer 206 is established. In the Rreconnect state 608, packet data service is active and the RRC layer 206 is in the process of being reestablished. In the Rdormant state 610, packet data service is active, which indicates that PPP is active but RLP is inactive.

Multiple Services

Figure 8:
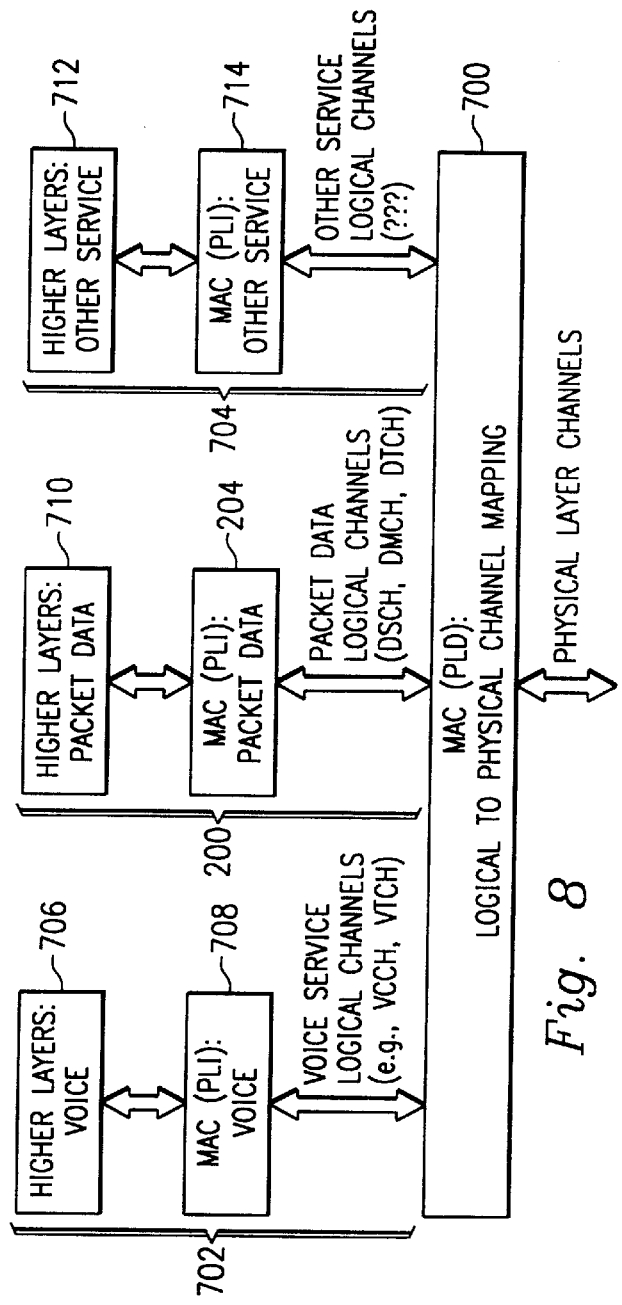
FIG. 8 is a layer diagram of the packet data control function of FIG. 3 for implementing multiple services.

Referring to FIG. 8, a Physical Layer Dependent (PLD) MAC, designated with a reference numeral 700, is used to map logical channels to physical channels. The MAC PLD 700 interfaces with multiple services, represented by a voice module 702, the packet data control module 200, and a third service module 704. The third service can be any service that can be performed on the network 10 (FIG. 1), such as circuit data service or packet data service associated with a special quality of service.

The voice module 702 includes a plurality of higher-level layers 706 and a physical layer independent (PLI) MAC layer 708. The packet data control module 200 includes a plurality of higher-level layers 710, as discussed above with reference to FIG. 3, and the PLI MAC layer 204. The third service module 704 includes a plurality of higher-level layers 712 and a PLI MAC layer 714.

The logical channels provided by the PLI MAC layers 708, 204, and 714 are dynamically mapped to a set of physical channels by the PLD MAC 700. Therefore, there is no interaction between the services 702, 200, 704, except at the PLD MAC layer 700. As a result, the introduction of a fourth service would be relatively simple because it too will not interact with any of the previous services, except at the PLD MAC layer 700.

Referring again to FIG. 3, by defining the Packet data control 200 as a collection of independent state machines, several benefits are realized. For one, each layer is independent, i.e., the state of one layer is not directly dependent on the state of other layers. This reduces complexity. Also, each layer is extensible. Because each layer is independent from the others, with well defined service points between them, the layers can be easily modified. For example, new features can be added to a layer without impact to the entire model.

Another benefit is that a layered structure facilitates the design of a system that supports the coexistence of multiple simultaneous services, e.g., voice and data. Also, the job of mapping logical communication channels to actual physical channels becomes more straight forward with simple state machines and well defined service interfaces. Furthermore, the use of multiple simple state machines instead of one complex state machine provides more flexibility in operation.

Yet another benefit of the Packet data control 200 is that layers can be reused. That is, the functionality of some layers may be shared by multiple services. This further facilities the design of a system that supports the coexistence of multiple simultaneous services, as described with respect to FIG. 8.

Although illustrative embodiments of the invention have been shown and described, other modifications, changes, and substitutions are intended in the foregoing disclosure. For example, the functionality of the various state machines can be performed by many different components of the wireless communications network 10 of FIG. 1. Accordingly, it is appropriate that the appended claims be construed broadly and in a manner consistent with the scope of the invention.

What is claimed is:

1. A method for facilitating a packet data service in a CDMA communications network having a physical layer, comprising:

providing a first layer for monitoring and controlling the use of logical channels on the physical layer, the first layer being controlled by a first state machine;

providing a second layer for performing point-to-point protocol functions, the second layer being controlled by a second state machine;

providing a third layer between the first and second layers for receiving and coordinating data transfers between the first and second layers, the third layer being controlled by a third state machine;

providing a fourth layer for managing call processing messages and functions in the CDMA network, the fourth layer being controller by a fourth state machine;

wherein the first, second, and third state machines operate independently from each other.

2. The method of claim 1 wherein the first layer is independent of the physical layer.

3. The method of claim 2 wherein the CDMA network includes a medium access control layer that is dependent on the physical layer and that dynamically maps the logical channels to a set of physical channels.

4. A packet data service for use in a CDMA communications network having a physical layer, comprising:

a first layer for monitoring and controlling the use of logical channels on the physical layer, the first layer being controlled by a first state machine;

a second layer for performing point-to-point protocol functions, the second layer being controlled by a second state machine;

a third layer between the first and second layers for receiving and coordinating data transfers between the first and second layers, the third layer being controlled by a third state machine;

a fourth layer for managing call processing messages and functions in the CDMA network, the fourth layer being controlled by a fourth state machine;

wherein the first, second, and third state machines operate independently from each other.

5. The packet data service of claim 4 wherein the first layer is independent of the physical layer.

6. The packet data service of claim 5 wherein the CDMA network includes a medium access control layer that is dependent on the physical layer and that dynamically maps the logical channels to a set of physical channels.

7. A software product for controlling a flow of packet data in a wireless network, the software product comprising:

a first set of instructions for controlling one or more logical channels for mapping to physical channels on a physical layer of the wireless network;

a second set of instructions for performing point-to-point protocol functions;

a third set of instructions for receiving and coordinating data transfers between the first and second sets of instructions and performing radio protocol functions;

wherein the first, second, and third sets of instructions operate independently from each other;

a fourth set of instructions for layer for managing call processing messages and functions in the network; the fourth set of instructions operating independently of the first, second and third sets of instructions.

8. The software product of claim 7 wherein the set of instructions can also accommodate another physical layer.

9. The software product of claim 7 wherein the network is a CDMA network.

10. A method for facilitating a first service and a second service in a CDMA communications network having a physical layer, the method comprising the steps of:

providing a first medium access control (MAC) layer for monitoring and controlling the use of logical channels used by the first service;

providing a second MAC layer for monitoring and controlling the use of logical channels used by the second service;

providing a third MAC layer for mapping logical channels to physical channels on the physical layer;

providing a first set of upper-level layers for performing point-to-point protocol functions and call control functions for the first service, the first set of upper-level layers interacting with the first MAC layer;

providing a second set of upper-level layers for performing point-to-point protocol functions and call control functions for the second service, the second set of upper-level layers interacting with the second MAC layer;

wherein the first and second MAC layers all operate independently from each other and the first and second sets of upper-level layers all operate independently from each other.

11. The method of claim 10 wherein the first and second MAC layers are independent of the physical layer, and the third MAC layer is dependent on the physical layer.

12. The method of claim 10 further wherein the first set of upper-level layers includes a layer for handling radio protocol functions.

13. The method of claim 10 further facilitating a third service in the CDMA communications network, the method further comprising the step of:

providing a fourth MAC layer for monitoring and controlling the use of logical channels used by the third service;

providing a third set of upper-level layers for performing point-to-point protocol functions and call control functions for the third service, the third set of upper-level layers interacting with the fourth MAC layer;

wherein the first, second, and fourth MAC layers all operate independently from each other and the first, second, and third sets of upper-level layers all operate independently from each other.

14. The method of claim 10 wherein the first and second services are packet data and voice, respectively.

15. The method of claim 13 wherein the first, second and third services are packet data, voice, and circuit data, respectively.

16. The method of claim 13 wherein the first, second and third services are a first packet data service, a voice service, and a second packet data service, respectively.

* * * * *